United States Patent
Saenz De Ugarte et al.

(10) Patent No.: US 8,203,226 B2
(45) Date of Patent: Jun. 19, 2012

(54) WIND TURBINE GEAR UNIT WITH CONCENTRIC HOLLOW TUBES

(75) Inventors: Patrik Saenz De Ugarte, Leioa (ES); Javier Barañano, Durango (ES); Wim Derkinderen, Ruisbroek (BE); Wim De Laet, Antwerp (BE)

(73) Assignees: ZF Wind Power Antwerpen N.V., Kontich (BE); Gamesa Innovation & Technology S.L., Sarriguren-Pamplona (ES)

( * ) Notice: Subject to any disclaimer, the term of this patent is extended or adjusted under 35 U.S.C. 154(b) by 531 days.

(21) Appl. No.: 12/342,508

(22) Filed: Dec. 23, 2008

(65) Prior Publication Data

US 2009/0186740 A1    Jul. 23, 2009

(30) Foreign Application Priority Data

Jan. 17, 2008  (EP) .................................. 08075047

(51) Int. Cl.
  *H02P 9/04*  (2006.01)
(52) U.S. Cl. ........................................ 290/44; 290/55
(58) Field of Classification Search ............... 290/44, 290/55
  See application file for complete search history.

(56) References Cited

U.S. PATENT DOCUMENTS

| | | | |
|---|---|---|---|
| 4,906,213 A * | 3/1990 | Esthimer | 440/50 |
| 6,176,804 B1 | 1/2001 | Kekki | |
| 6,239,507 B1 | 5/2001 | Douthit | |
| 6,420,808 B1 * | 7/2002 | Hosle | 310/83 |
| 6,676,379 B2 * | 1/2004 | Eccles et al. | 416/170 R |
| 7,753,817 B2 * | 7/2010 | Ryymin et al. | 475/150 |
| 7,815,536 B2 * | 10/2010 | Jansen et al. | 475/159 |
| 2004/0162181 A1 * | 8/2004 | LaBath | 475/338 |
| 2010/0007150 A1 * | 1/2010 | Ciszak et al. | 290/55 |
| 2010/0007151 A1 * | 1/2010 | Ciszak et al. | 290/55 |
| 2011/0148111 A1 * | 6/2011 | Oosterling | 290/44 |

FOREIGN PATENT DOCUMENTS

| | | |
|---|---|---|
| DE | 10318945 | 10/2004 |
| DE | 102005011023 | 9/2006 |
| EP | 1717489 | 11/2006 |
| EP | 1717489 A2 * | 11/2006 |
| ES | 2274696 | 5/2007 |
| WO | 2006053940 | 5/2006 |

OTHER PUBLICATIONS

European Search Report dated Jun. 26, 2008, in priority application.

* cited by examiner

*Primary Examiner* — Tulsidas C Patel
*Assistant Examiner* — Stefan Mikailoff
(74) *Attorney, Agent, or Firm* — Young & Thompson (57) ABSTRACT

A gear unit for a wind turbine having an input shaft connected to the rotor hub of the wind turbine and an output shaft for connection to an electrical power generator, characterized in that the gear unit is provided with a hollow tube which is concentric with the main rotation axis and which extends through the gear unit from the input shaft to the output shaft, whereby this hollow tube provides a sealing for the gear unit in storage and transport.

20 Claims, 7 Drawing Sheets

WIND TURBINE GEAR UNIT WITH CONCENTRIC HOLLOW TUBES

The present invention relates to a gear unit for a wind turbine.

More specifically, the present invention relates to a gear unit for a wind turbine having an input shaft connected to the rotor blades of the wind turbine and an output shaft for connection to an electrical power generator.

Such gear units are already known according to the state of the art. Hereby, the gear unit usually contains one or more planetary stages, whereby the planet carrier of the first planetary stage fulfills the role of the input shaft and the output shaft is usually a shaft on which the sun wheel of the last planetary gear stage is mounted.

In this manner the slow rotation of the rotor blades is transformed in a rotation that is sufficiently fast in order to let the power generator function properly.

However, a practical problem for example with all the known gear units is how to control the so-called pitch of the rotor blades. This pitch is the amount of rotation that is given to the rotor blades along their longitudinal axis with regard to the plane in which the blades are rotating.

Depending on the wind speed, this pitch has to be more or less in order to obtain an acceptable speed of rotation of the rotor blades. Often the pitch of the rotor blades can be set by means of electrical motors or hydraulic actuators.

In order to allow the pitch of the rotor blades to be controlled and set, there is a need to pass electrical power and signal cables through the gear unit and possibly even hydraulic tubes, for instance in the case the blades are driven through an hydraulic actuator.

A problem hereby is that the power and/or the hydraulic drive are normally supplied from a static point on the housing of the wind turbine, while the rotor blades are rotating when the wind turbine is functioning.

As is known, usually some kind of rotational energy connection is used.

For example, for the transfer of electrical current from a stationary conductor into a rotating conductor often a rotational energy connection in the form of a slip ring assembly, also called a collector ring assembly or a rotary electrical contact assembly, is used.

Typically, it is comprised of a stationary graphite or metal contact (brush) which rubs on the outside diameter of a rotating metal ring. As the metal ring turns, the electrical current or signal is conducted through the stationary brush to the metal ring making the connection.

Similar rotational energy connectors exist for the transfer of hydraulic power from a static housing to a rotating part, for example from the housing of a wind turbine to its rotor hub.

A difficulty of such systems is that one side of the cabling and tubing is on the rotor blades, the other side on the wind turbine housing, whereby the rotor blades and the wind turbine housing only come together during the final assembly on site.

Therefore, it is unavoidable that cabling and tubing have to be installed, at least in part, during the final assembly on site of the wind turbine, which is far from practical.

Hereby a lot of care needs to be taken to avoid contact of the cabling and tubes with the rotating parts of the gear unit of the wind turbine.

Another problem is that cabling has to be passed through a zone that has to be lubricated severely and on a permanent basis because of its nature.

In some known designs of wind turbines an energy tube is used for this purpose, which energy tube is a kind of hollow pipe in which the cabling and tubing is to be installed.

Usually, this energy tube is passed through the centre of the gear unit and often also through the centre of the electrical power generator.

Normally, the energy tube is rigidly connected to the rotor hub and the actual transfer of electrical and/or hydraulic power from the static housing to the rotating hub is obtained by a rotational energy connector, which is installed between the rotating energy hub and the housing of the wind turbine, at the generator side of the energy tube.

The cabling and tubing are static with regard to the energy tube. Nevertheless, these cables or tubes are often damaged through the rotating action of the energy tube and because of a bad fixation of the cables and tubes on the inner surface of the energy tube.

A practical problem with the use of an energy tube is that often the gear unit is manufactured by specialists in that technical field, while the final assembly of the complete wind turbine is the responsibility of a wind turbine manufacturer.

So, there is a need for having a proper interface between both manufacturers. Often, it is the gear unit manufacturer that installs the energy tube directly in the gear unit during the assembly of the gear unit in the factory.

Hereby, the energy tube provides in the same time a seal for the gear unit, for example during storage in a warehouse and during transport of the gear unit from the factory to site, as well as after the installation of the gear unit on site.

The seal avoids oil leaking out of the gear unit or dirt from the environment entering into the gear unit.

With this solution the energy tube is actually fulfilling two tasks, on the one hand it provides a housing for passing cables, etc . . . that can take a certain load, force as well as torque, exerted by the rotational energy connector, and on the other hand, it provides a sealing for the gear unit.

It is clear that in such a case the responsibilities with regard to technical failure of the energy tube are not sharply defined between the gear unit manufacturer and the wind turbine manufacturer.

Indeed, for example when a gear unit is not sealed correctly due to leakage through the energy tube, the cause could be a bad assembly under the responsibility of the gear unit manufacturer, as well as for example the application of an overload by the wind turbine manufacturer on a correctly installed energy tube.

Another disadvantage of these known gear units with rotating energy tube is that the rotational energy connector consumes a lot of space, which hinders the development of more integrated designs of wind turbines.

The present invention aims at a gear unit for use in a wind turbine, which does not show one or more of the above and other disadvantages.

To this aim, the invention relates to a gear unit for a wind turbine having an input shaft connected to the rotor hub of the wind turbine and an output shaft for connection to an electrical power generator, the gear unit being provided with a hollow tube which is concentric with the main rotation axis and which extends through the gear unit from the input shaft to the output shaft, whereby this hollow tube provides a sealing for the gear unit in storage and/or transport, the hollow tube extending additionally through the electrical power generator, wherein inside the hollow tube an energy tube is provided for housing cabling and/or tubing for the transmission of electrical and/or hydraulic power from the static housing of the wind turbine to the rotatable rotor hub.

An important advantage of such a gear unit according to the present invention is that the hollow tube can be mounted on the gear unit during manufacturing of the gear unit, for example by bolting or welding, whereby the gear unit is sealed completely at the same time, the seal being provided in a controlled manner in well defined circumstances which are easily obtained in a factory or workshop.

Hereby, the function of sealing the gear unit is completely fulfilled by the hollow tube, the hollow tube providing a good interface that divides the responsibilities between the gear unit manufacturer and the wind turbine manufacturer.

According to a preferred embodiment of a gear unit in accordance with the present invention an energy tube is provided inside the hollow tube or dummy tube for housing cabling and/or tubing for the transmission of electrical and/or hydraulic power from the static housing of the wind turbine to the rotatable rotor hub, for example by a shrink fit or a welded connection of the energy tube on the hollow tube.

An advantage of a gear unit in accordance with the present invention is that through the hollow tube an energy tube can be easily installed, whereby no special attention is needed anymore with regard to the sealing of the gear unit.

Hereby, the classic problems encountered during the assembly of the wind turbine are solved.

According to a preferred embodiment of a gear unit in accordance with the present invention, the energy tube is connected fixedly to the housing of the gear unit or to the nacelle of the wind turbine.

An advantage of this embodiment of a gear unit in accordance with the present invention is that the energy tube containing cables and tubing is static, so that there is less risk for damage on these parts.

For the actual transfer of energy from the static housing to the rotating hub, the energy tube is according to the present invention preferably linked to a rotating energy connector, which is installed on the energy tube at the input shaft side of the gear unit.

An advantage of this embodiment in accordance with the present invention is that the rotating energy connector is positioned in front of the gear unit, so that more space is available at the generator side of the wind turbine, and reduced dimensions of the wind turbine can be obtained.

BRIEF DESCRIPTIONS OF DRAWINGS

With the intention of better showing the characteristics of the invention, hereafter, as an example without any restrictive character whatsoever, a preferred form of embodiment of a gear unit according to the present invention is described, with reference to the accompanying drawings, wherein.

DETAILED DESCRIPTIONS OF THE DRAWINGS

Figure 1:
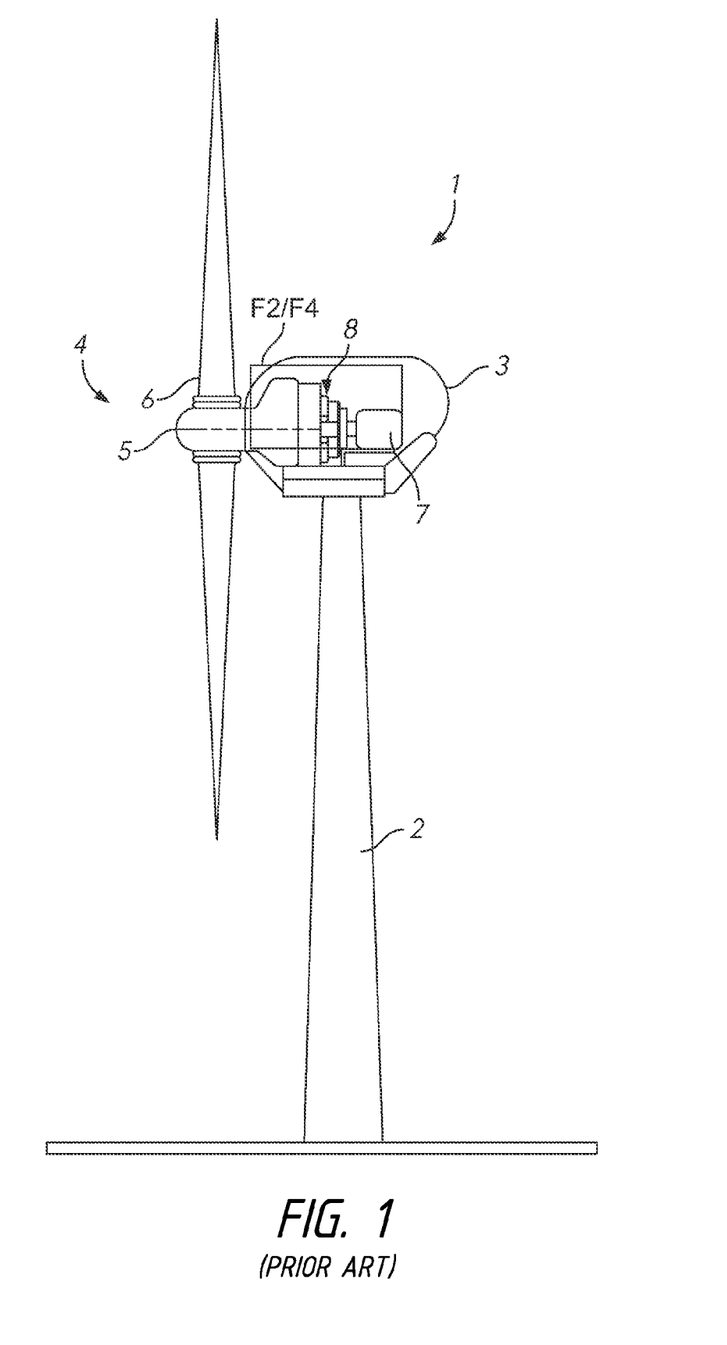
FIG. 1 represents a cross-section of a typical wind turbine having a gear unit.

The wind turbine 1 represented in FIG. 1 consists mainly of a supporting structure 2 on which a nacelle 3 is mounted in a rotatable manner.

This allows for the positioning of the wind turbine 1 with regard to the wind direction.

The nacelle 3 contains the rotor 4 of the wind turbine 1, having a rotor hub 5 and rotor blades 6, which rotor 4 is connected to an electrical power generator 7 by means of a gear unit 8.

Figure 2:
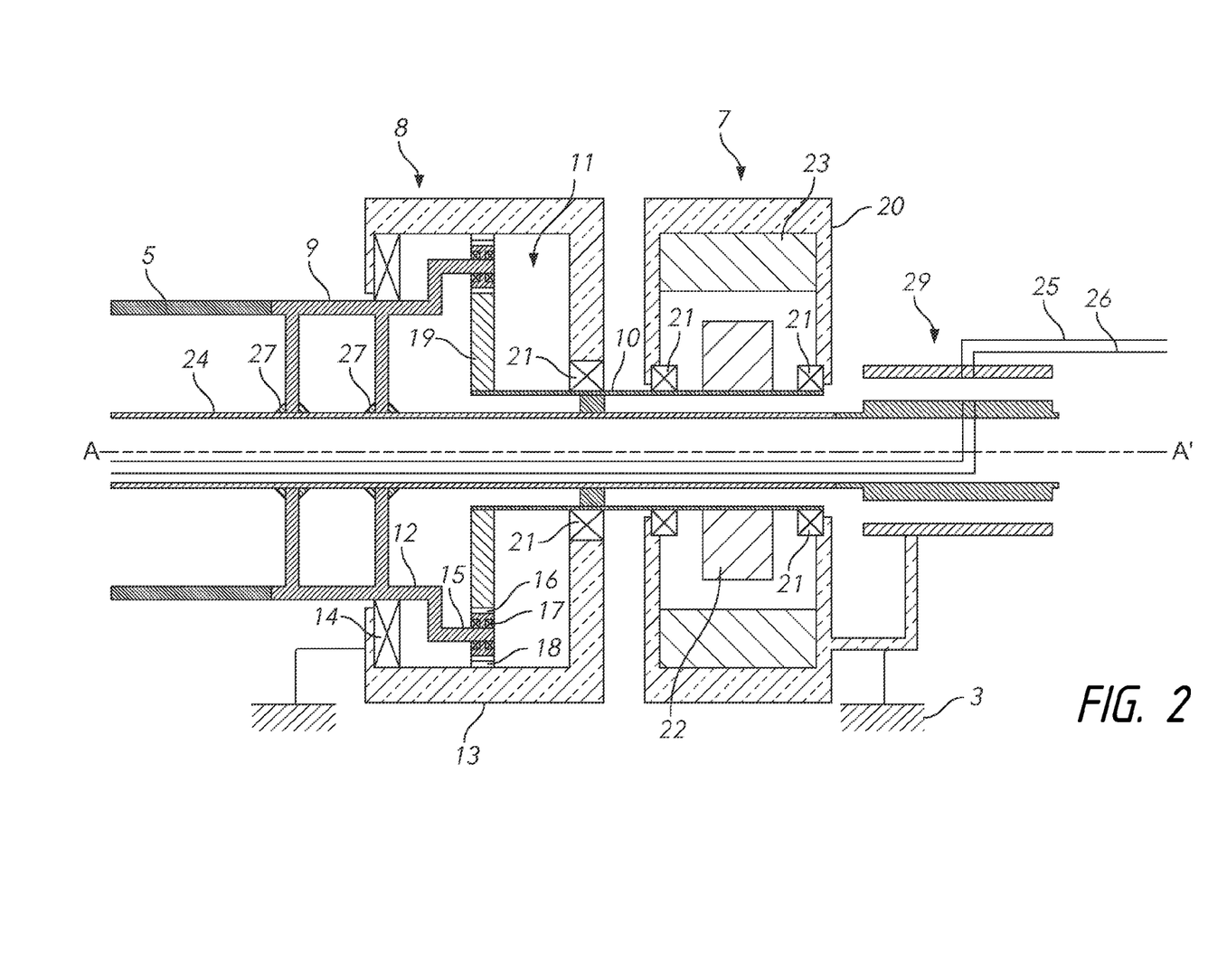
FIG. 2 represents schematically and on a bigger scale the part of the wind turbine indicated by F2 in FIG. 1, for a wind turbine having a known gear unit.
Figure 3:
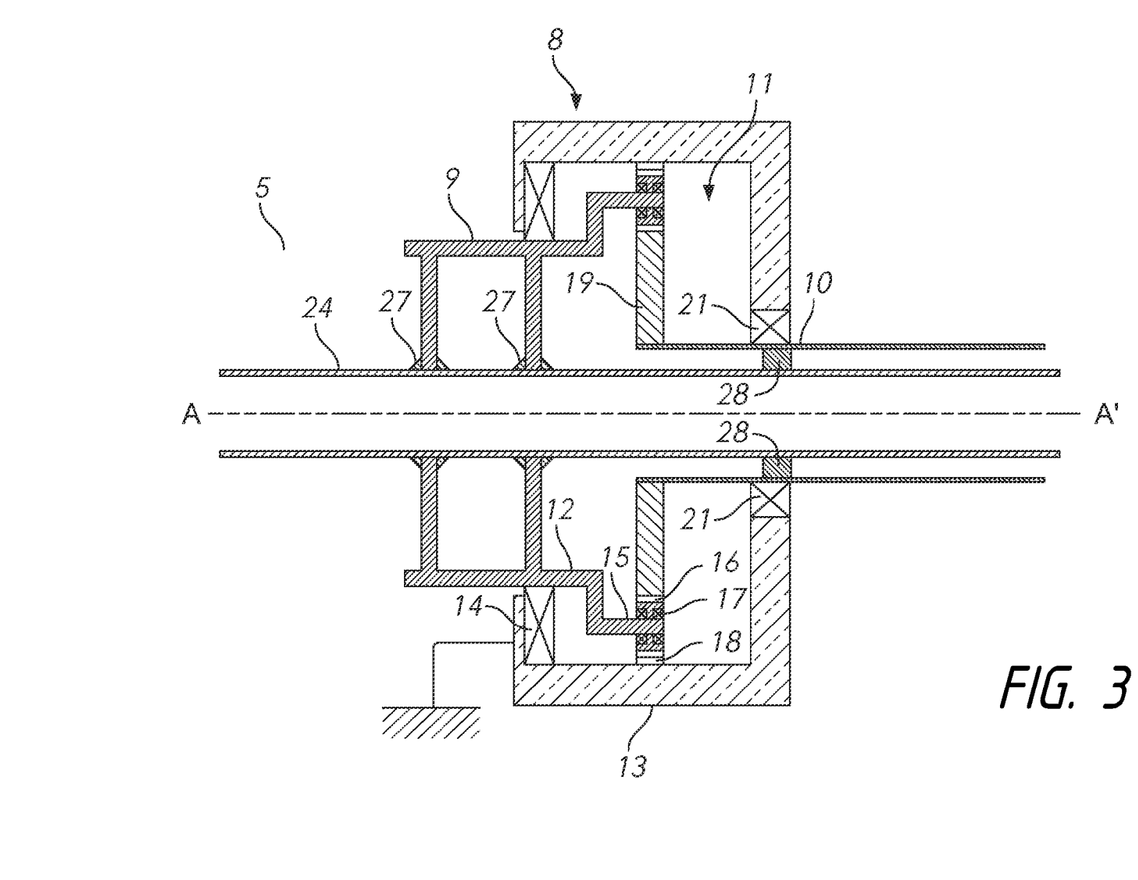
FIG. 3 represents the known gear unit of FIG. 2 before assembly in the wind turbine.

Such a gear unit 8 is the subject of the present invention and is represented schematically more in detail in FIGS. 2 and 3 for an embodiment known according to the state of the art, respectively after and before assembly in a wind turbine.

As is known, the aim of such a gear unit 8 is to transform the slow rotation of the rotor hub 5 and rotor blades 6 which are connected to the input shaft 9 of the gear unit 8 into a fast rotation at the output shaft 10 of the gear unit 8 which is connected to the electrical power generator 7, in order to have a sufficient rotational speed at the generator 7 for its correct functioning.

Usually a good transmission ratio of the gear unit 8 is provided by one planetary gear stage 11, as in the case of the FIGS. 2 and 3, or more planetary gear stages.

The planet carrier 12 of the planetary gear stage 11 is in the represented case mounted rotatably with regard to the housing 13 of the gear unit 8 by means of planet carrier bearings 14.

Hereby the planet carrier 12 serves as an input shaft 9 of the gear unit 8, which input shaft 9 is connected to the rotor hub 5 of the wind turbine 1.

Furthermore, the planet carrier 12 is provided with planet shafts 15 on which planet wheels 16 are mounted rotatably by means of planet bearings 17.

The planet wheels 16 interact on the one hand with a ring wheel 18 which is fixedly connected to the housing 13 of the gear unit 8, and on the other hand with a sun gear 19, which is mounted on the output shaft 10 of the gear unit 8, this output shaft 10 of the gear unit 8 serving as an input shaft of the electrical power generator 7.

The output shaft 10 is rotatably mounted with regard to the nacelle 3, gear unit housing 13 and the electrical power generator housing 20.

In the represented case of FIG. 2 this is obtained by output shaft bearings 21 which are for example installed in the gear unit housing 13 or in the generator housing 20, but a lot of other mountings are possible.

Typically, in an electrical power generator 7 the rotating shaft 10 is bearing a rotor 22 which interacts with a stator winding 23 in order to generate electrical power.

As explained in the introduction, there is often a need to pass electrical power and signal cabling as well as, or alternatively, hydraulic tubing from the output shaft 10 side to the input shaft 9 side, for example in order to provide control means for setting the pitch of the rotor blades 6.

One can understand that if no special measures are taken, it is rather difficult to provide sufficient space for these cabling and tubing, the great number of gears and shafts making this a big challenge.

Furthermore, a gear unit 8 as shown is normally provided with a lubrication system, the lubrication being spread throughout the whole gear box. Such a situation is not favorable for the installation of electrical wiring, maintenance of the pitch control system, etc . . .

A known solution to this problem is represented in the FIGS. 2 and 3.

Hereby, a so-called energy tube 24 is inserted through the gear unit 8, in this particular case through the input shaft 9 and the output shaft 10, whereby electrical power and signal cabling 25 as well as hydraulic tubing 26 can be installed in this energy tube 24 during the installation of the gear unit in the nacelle 3.

At the input shaft 9 side of the gear unit 8 this energy tube 24 is to be connected to the rotor hub 5, for example by a shrink fit or by a welded connection 27, and as a consequence, the energy tube 24 is rotating with the rotor hub 5.

Usually, during the assembly of the gear unit one or more seals 28 are also provided in order to seal the gear unit 8 so that no oil leaks out of the gear unit housing 13, nor impurities from the environment can enter the gear unit 8, for example during storage and transport of the gear unit 8, as well as after the installation of the gear unit 8 in the wind turbine nacelle.

At the output shaft side 10 of the gear unit 8 the energy tube 24 is connected to a rotating energy connector 29, as for example a slip ring assembly or the like, in which energy is passed from the rotating rotor hub 5 to the static nacelle 3.

As mentioned in the introduction, such a known gear unit 8 with the typical known solution of transferring electric cabling 25 and/or hydraulic tubing 26 through the gear unit 8 and/or generator 7 has several disadvantages.

For example, it is clear that the cabling 25 and tubing 26 are rotating with the rotor hub 5 and are therefore submitted to the rotating action of the rotor hub 5 which is a possible cause of damage to the cables 25 and the tubes 26.

Furthermore, the energy tube 24 is typically a part provided by the wind turbine manufacturer, whereby it provides, on the one hand, a housing for the cabling 25 and tubing 26, but on the other hand, also a seal for the gear unit 8 itself. This means that the load on the energy tube 24 exerted by the rotating energy connector 29 is affecting the seal, but on the other hand also the quality of the seal limits the load that can be taken by the energy tube 24.

Furthermore, it is clear that the rotating energy connector 29 requires a lot of space at the generator 7 side, so that it limits the possibilities of reducing the dimensions of the wind turbine 1.

Figure 4:
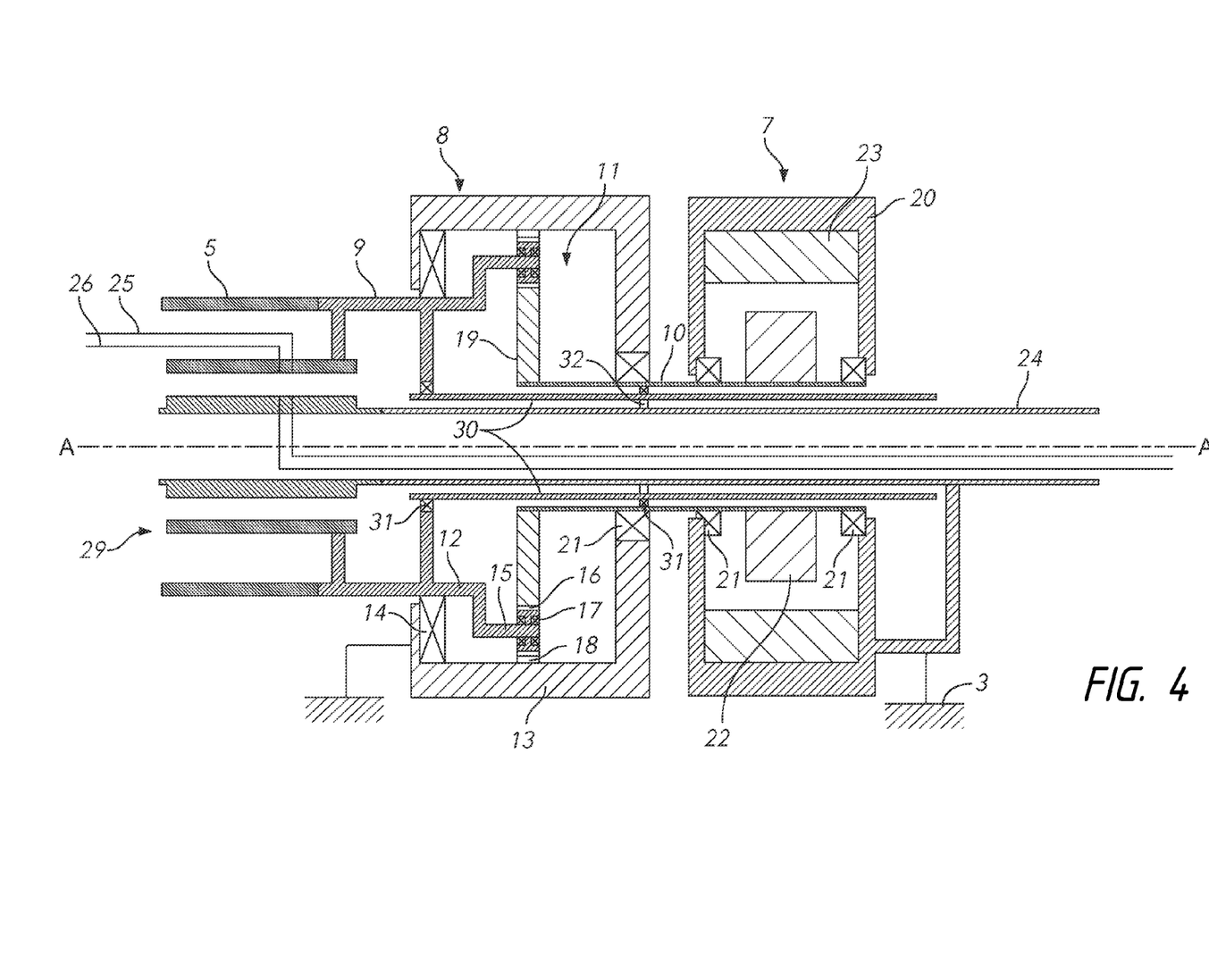
FIGS. 4 and 5 represent analogously to FIGS. 2 and 3 a gear unit according to the present invention, respectively after and before assembly in the wind turbine; and, FIG. 6 and 7 represent, analogously to FIGS. 4 and 5, another embodiment of a gear unit according to the present invention, respectively after and before assembly in the wind turbine.
Figure 5:
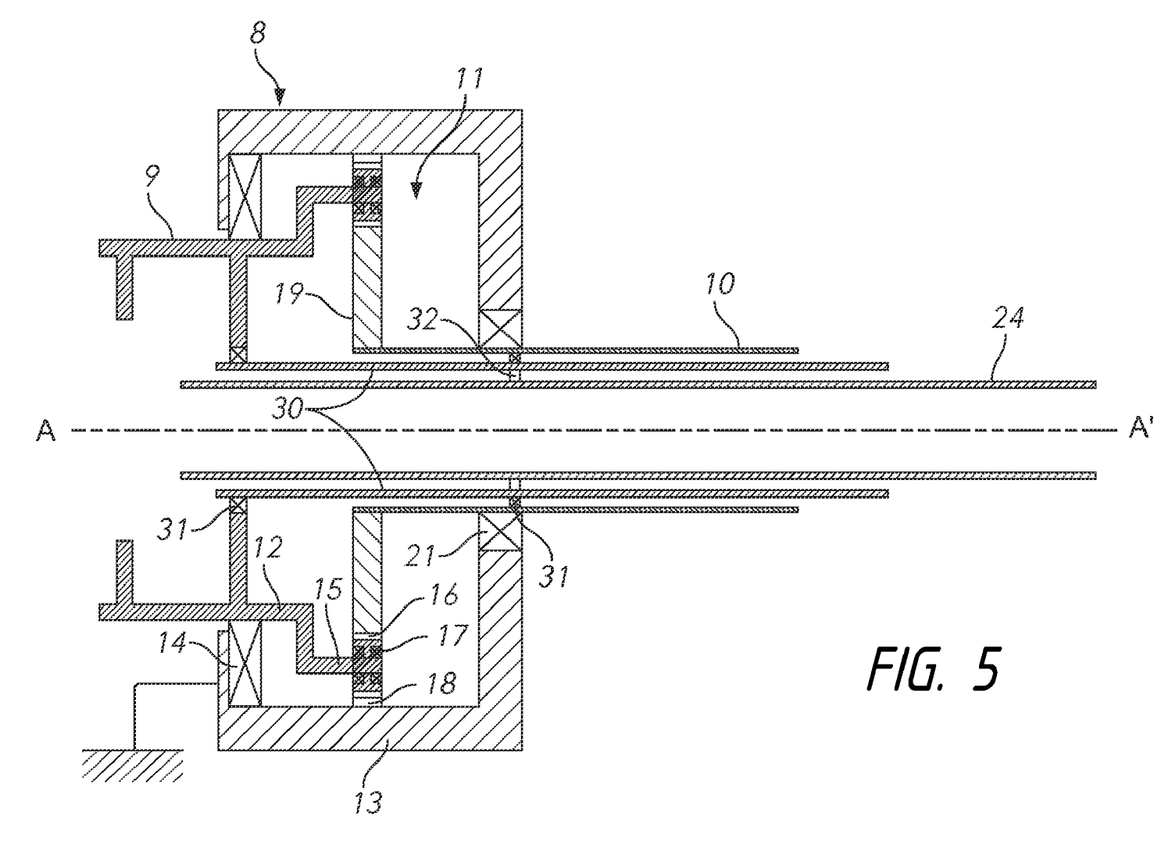

With a gear unit 8 in accordance with the present invention these problems can be solved, as is shown in FIGS. 4 and 5.

Such a gear unit 8 is provided with a hollow or dummy tube 30 which is concentric with the main rotation axis AA' and which extends through the gear unit 8 from the input shaft 9 to the output shaft 10.

Hereby, this hollow tube 30 provides a sealing for the gear unit 8 in storage and transport, as becomes clear from FIG. 5 showing the gear unit 8 in this situation before the installation in a wind turbine nacelle 3.

In this particular case for example, the sealing of the gear unit 8 is obtained, for example by bearings 31 supporting the hollow tube in a rotatable manner with regard to the rotating parts of the gear unit 8, i.e. the input shaft 9 and the output shaft 10, which bearings 31 are for example provided with a bearing cap that seal the gear unit 8.

Of course other embodiments are not excluded according to the present invention.

In this way a first aim of the invention is obtained, since a gear unit 8 having such a hollow tube 30 is completely sealed, so that leakage of oil out of the gear unit 8 during transport, storage and/or installation is impossible.

The hollow tube 30 can be mounted during the assembly of the gear unit 8, for example in a factory or a workshop, so that the conditions in which the gear unit 8 is sealed are controllable and adaptable to the required needs.

An advantage of such a gear unit 8 according to the present invention with such a hollow tube 30 with regard to the known gear units 8 without hollow tube 30 is that the hollow tube 30 takes completely the function of sealing the gear unit 8, so that an appropriate interface is obtained on which the responsibilities between a gear unit manufacturer and a wind turbine manufacturer can be clearly divided.

Another advantage of a gear unit 8 in accordance with the present invention is that inside the hollow tube 30 an energy tube 24 is easily installed for housing cabling 25 and/or tubing 26 for the transmission of electrical and/or hydraulic power from the static housing 3 of the wind turbine 1 to the rotatable rotor hub 5.

It is clear that the installation of an energy tube 24 in the case of a gear unit 8 according to the invention is much easier than with the known gear units 8.

Indeed, there is no need for special measures in order to seal the gear unit 8, since this seal is already provided by the hollow tube 30.

Preferably, the energy tube 24 is connected fixedly to the housing 13 of the gear unit 8 or to the nacelle 3 of the wind turbine 1.

This means the energy tube 24 is static with regard to the nacelle 3 of the wind turbine 1, so that there is less risk for damage to cables 25 and tubes 26 inside the energy tube 24 due to the rotating action of the energy tube 24.

This static connection of the energy tube 24 is only possible since the energy tube 24 is linked to a rotating energy connector 27 for the actual transfer of the energy from the rotating hub 5 to the static housing 3, the rotating energy connector 27 being installed on the energy tube 24 at the input shaft 9 side of the gear unit 8.

In that manner, another aim of the invention is obtained, i.e. there is no space required at the generator 7 side for an rotating energy connector 27, so that smaller dimensions of the wind turbine 1 become possible.

In the embodiment of the FIGS. 4 and 5 the hollow tube 30 is fixedly connected to the energy tube 24 for example by means of a shrink fit type connection or by a welded connection 32, so that the hollow tube 30 is also fixedly connected to the housing 13 of the gear unit 8.

Figure 6:
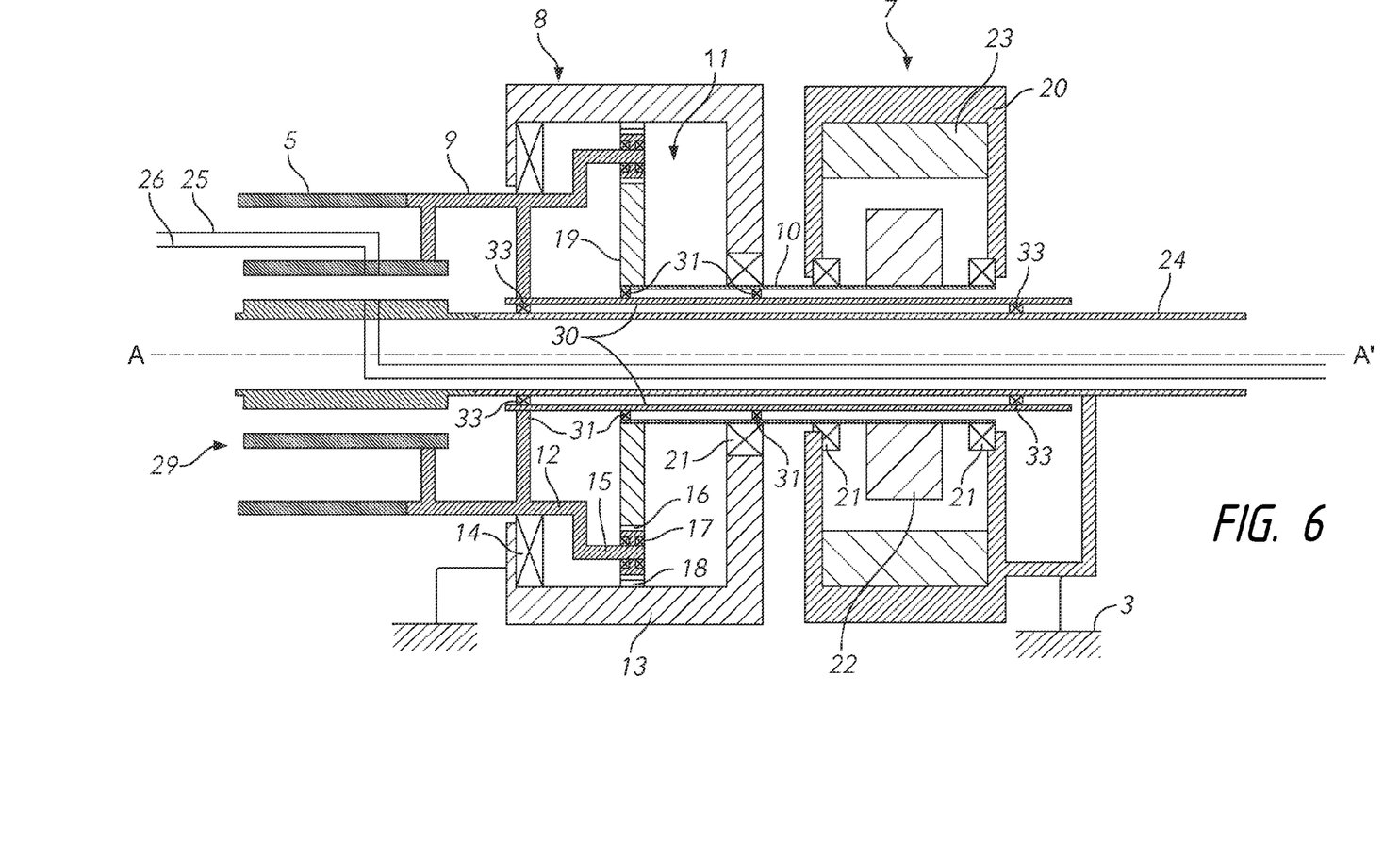
Figure 7:
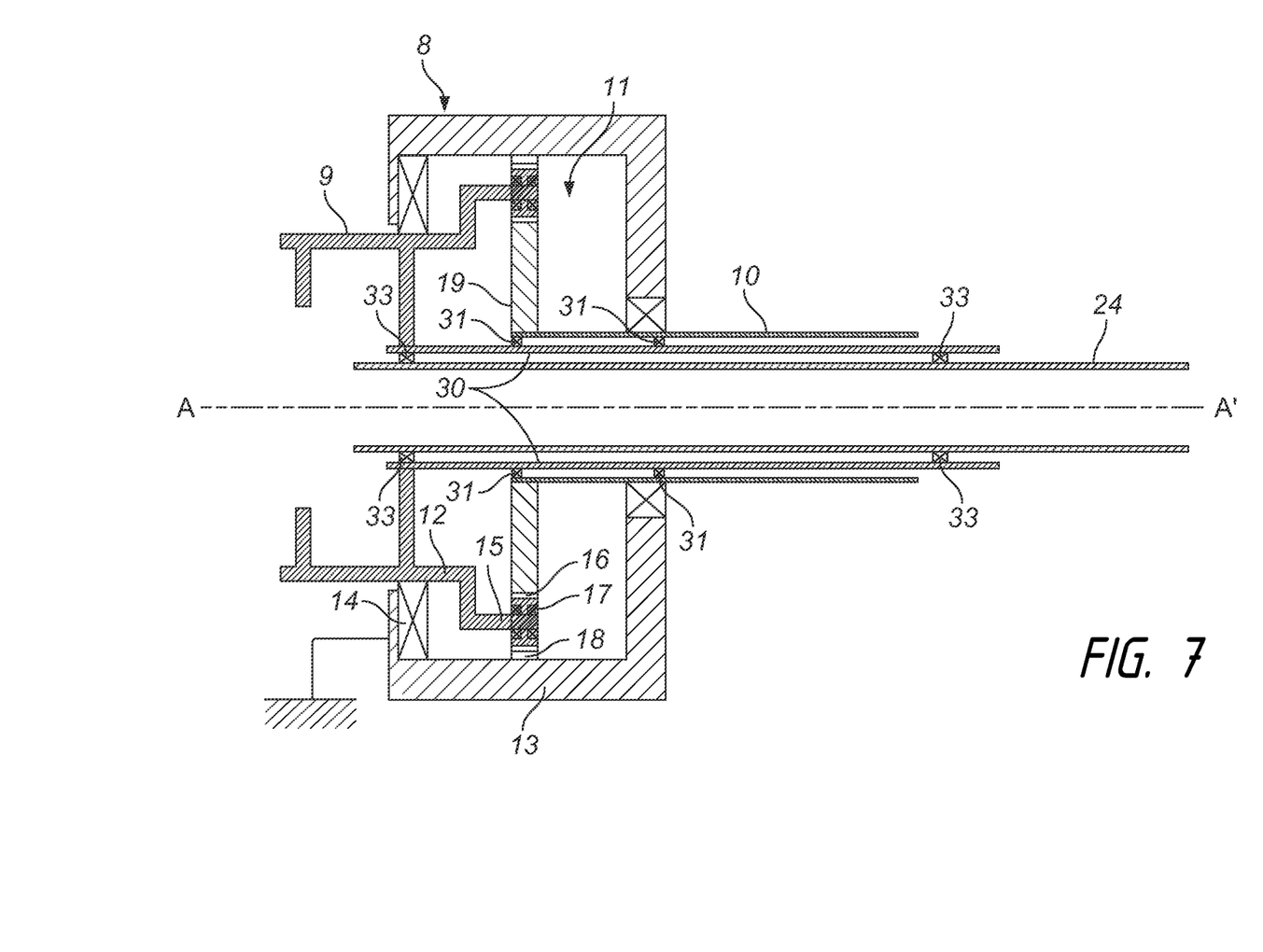

In another embodiment, represented in FIGS. 6 and 7, the hollow tube 30 is connected fixedly to the rotatable input shaft 9 and the energy tube 24 is connected to the static nacelle 3.

As a consequence in such an embodiment in accordance with the present invention, there is a difference of rotation speed between the energy tube 24 and the hollow tube 30, so that it is preferable to support the energy tube 24 rotatably in the hollow tube 30, for example by bearings 33.

It is clear that such embodiments of a gear unit 8 in accordance with the present invention are particularly interesting for application in a wind turbine 1 having a pitch control system, whereby the energy tube 24 installed in the hollow tube 30 is used for passing electrical and/or hydraulic energy from the static housing 3 to the rotor hub 5 for the functioning of the pitch control system.

In some cases it can be interesting to provide the gear unit 8 with a hollow tube 30 or energy tube 24 which extends additionally through the electrical power generator 7.

One can understand that such a hollow tube 30 or energy tube 24 according to this embodiment is particularly interesting, since it allows to pass cabling and tubing through the whole central axis AA' of the assembled gear unit 8 and electrical power generator 7.

In some other cases it can be advantageous to execute the hollow tube 30 as a tube which is composed of multiple parts.

This can be advantageous for example during the assembly of the gear unit 8.

However, in the case the hollow tube 30 is composed of multiple parts, it is preferable according to the present invention that these multiple parts of the hollow tube 30 are connected to one another in such a way that torque can be transmitted through the tube 30.

The reason for this is that the hollow tube 30 is for example supported by bearings rotating with regard to other rotating parts of the gear unit 8, so that loosening of the multiple parts of the hollow tube 30 due to friction for example has to be avoided.

A lot of other practical solutions are possible than the one represented in FIG. 3.

For example, gear units 8 having two or even more planetary gear stages 11 are not excluded from the present invention.

Also completely other ways of supporting the different shaft are possible using bearings that are placed in other positions and so on.

Also it is possible to realize a fixed connection between the output shaft 10 and the hollow tube 30 while supporting the other end of the hollow tube 30 in a rotatable manner with regard to the input shaft 9 by means of a bearing.

The present invention is in no way limited to the embodiments described above and represented in the drawings, but such a gear unit 8 may be realised in different shapes and dimensions, without departure from the scope of the invention.

The invention claimed is:

1. A gear unit (8) for a wind turbine (1) having an input shaft (9) connected to a rotor hub (5) of the wind turbine (1) and an output shaft (10) for connection to an electrical power generator (7), the gear unit (8) comprising:
   a hollow tube (30) which is concentric with a main rotation axis (AA') and which extends through the gear unit (8) from the input shaft (9) to the output shaft (10), wherein, the hollow tube (30) provides a sealing for the gear unit (8) in storage and/or transport;
   the hollow tube (30) extends additionally through the electrical power generator (7); and
   an energy tube (24) provided inside the hollow tube (30), the energy tube (24) provided for at least one of housing cabling (25) and tubing (26) and for the transmission of at least one of electric power and hydraulic power from rotatable rotor hub (5) to a static nacelle (3) of the wind turbine (1).

2. A gear unit (8) for a wind turbine (1) according to claim 1, wherein the hollow tube (30) is fixedly connected to a housing (13) of the gear unit (8).

3. A gear unit (8) for a wind turbine (1) according to claim 1, wherein the hollow tube (30) is fixedly connected to the input shaft (9) of the gear unit (8).

4. A gear unit (8) for a wind turbine (1) according to claim 1, wherein the hollow tube (30) is composed of multiple parts.

5. A gear unit (8) for a wind turbine (1) according to claim 4, wherein the multiple parts of the hollow tube (30) are connected to one another in such a way that torque can be transmitted through the hollow tube (30).

6. A gear unit (8) for a wind turbine (1) according to claim 1, wherein the energy tube (24) is supported rotatably in the hollow tube (30) by bearings (33).

7. A gear unit (8) for a wind turbine (1) according to claim 1, wherein the energy tube (24) is connected fixedly to the hollow tube (30).

8. A gear unit (8) for a wind turbine (1) according to claim 1, wherein the energy tube (24) is connected fixedly to the housing (13) of the gear unit (8) or the nacelle (3) of the wind turbine (1).

9. A gear unit (8) for a wind turbine (1) according to claim 1, wherein the energy tube (24) is linked to a rotating energy connector (29) for a transfer of energy between the static nacelle (3) and the rotatable rotor hub (5), the rotating energy connector (29) being installed on the energy tube (24) at the input shaft (9) side of the gear unit (8).

10. A gear unit (8) for a wind turbine (1) according to claim 1, wherein the gear unit (8) is applied in a wind turbine (1) having a pitch control system, whereby the energy tube (24) is installed in the hollow tube (30) for passing electrical and/or hydraulic energy between the static nacelle (3) and the rotor hub (5) for the functioning of the pitch control system.

11. A gear unit (8) for a wind turbine (1) according to claim 10, wherein the hollow tube (30) is fixedly connected to the input shaft (9) of the gear unit (8).

12. A gear unit (8) for a wind turbine (1) according to claim 10, wherein the hollow tube (30) is composed of multiple parts.

13. A gear unit (8) for a wind turbine (1) according to claim 2, wherein the hollow tube (30) is composed of multiple parts.

14. A gear unit (8) for a wind turbine (1) according to claim 3, wherein the hollow tube (30) is composed of multiple parts.

15. A gear unit (8) for a wind turbine (1) having a nacelle (3) mountable in a rotatable manner on a supporting structure, the nacelle containing a rotatable rotor hub (5) and rotor blades (6), and an output shaft (10) for connection to an electrical power generator (7) within an electrical power generator housing (20), the gear unit (8) comprising:
   a housing (13);
   a planetary gear stage (11) comprising
   i) a planet carrier (12) mounted rotatably with regard to the housing (13) via planet carrier bearings (14), the planet carrier (12) being an input shaft connected to the rotor hub (5),
   ii) planet shafts (15),
   iii) planet wheels (16) mounted rotatably via planet bearings (17) on the planet shafts (15),
   iv) a ring wheel (18) fixedly connected to the housing (13),
   v) a sun gear (19) mounted on the output shaft (10), the planet wheels (16) interacting with the ring wheel (18), and with the sun gear (19), the output shaft (10) being rotatably mounted with regard to the nacelle (3), gear unit housing (13), and the electrical power generator housing (20);
   a sealed hollow tube (30) concentric with a main rotation axis (AA') of the gear unit, the hollow tube (30) extending through the gear unit (8) from the planet carrier (12) to the output shaft (10);
   bearings (31) sealing and supporting the hollow tube (30) in a rotatable manner with regards to the planet carrier (12) and the output shaft (10), the bearings (31) providing a sealing for the gear unit (8) in storage and transport, the bearings (31) preventing leakage of oil out of the gear unit during storage and transport,
   the hollow tube (30) extending additionally completely through the electrical power generator housing (20); and
   an energy tube (24) provided inside the hollow tube (30), the energy tube (24) provided for housing at least one of cabling (25) and tubing (26) for the transmission of electrical and/or hydraulic energy between the nacelle (3) and the rotatable rotor hub (5).

16. The gear unit (8) of claim 15, further comprising:
a rotating energy connector (29) linked to the energy tube (24) for a transfer of energy from the rotatable hub (5) to the nacelle (3), the rotating energy connector (29) being installed on the energy tube (24) at the input shaft side of the gear unit, wherein the energy tube (24) is fixedly connected to one of the housing (13) of the gear unit (8) and the nacelle (3) such that the energy tube (24) is static with regard to the nacelle (3).

17. The gear unit (8) of claim 16,
wherein the hollow tube (30) is fixedly connected to the energy tube (24) so that the hollow tube 30 is also fixedly connected to the housing (13) of the gear unit (8).

18. The gear unit (8) of claim 16, wherein,
the hollow tube (30) is fixedly connected to a rotatable input shaft (9),
the energy tube (24) is connected to the nacelle (3),
and there is a difference of rotation speed between the energy tube (24) and the hollow tube (30).

19. The gear unit (8) of claim 15, wherein the energy tube (24) provides housing for at least one of cabling (25) and tubing (26) for the transmission of electrical power and/or hydraulic power from the rotatable rotor hub (5) to the nacelle (3).

20. A gear unit (8) for a wind turbine (1) having a nacelle (3) mountable in a rotatable manner on a supporting structure, the nacelle containing a rotor hub (5) and rotor blades (6), an input shaft (9), and an output shaft (10) for connection to an electrical power generator (7) within an electrical power generator housing (20), the gear unit (8) comprising:
  a housing (13);
  a planetary gear stage (11) comprising a planet carrier (12) mounted rotatably with regard to the housing (13) via planet carrier bearings (14), the planet carrier (12) being an input shaft connected to the rotor hub (5);
  a sealed hollow tube (30) concentric with a main rotation axis (AA') of the gear unit, the hollow tube (30) extending through the gear unit (8) from the planet carrier (12) to the output shaft (10);
  the hollow tube (30) sealing the planet carrier (12) and the output shaft (10) in storage and transport and preventing leakage of oil out of the gear unit during storage and transport,
  the hollow tube (30) extending additionally completely through the electrical power generator housing (20); and
  an energy tube (24) provided inside the hollow tube (30), the energy tube (24) provided for housing at least one of cabling (25) and tubing (26) for the transmission of electrical power and/or hydraulic power from the rotatable rotor hub (5) to the nacelle (3).

* * * * *